Patented Apr. 4, 1944

2,345,862

UNITED STATES PATENT OFFICE 2,345,862

FREE-FLOWING SULPHUR

Fairleigh E. Smith, Harlingen, Tex.

No Drawing. Application March 14, 1941,
Serial No. 383,451

1 Claim. (Cl. 23—224)

This invention relates to providing free-flowing sulphur.

Sulphur is required in very finely divided condition for various purposes, but sulphur compacts easily. For example, sulphur is required in substantially dust-like form for horticultural purposes. The sulphur dust spreads upon foliage substantially as a film and coats the insects and parasites thereon. But the fine sulphur particles agglomerate, and disrupt the film and impair the efficacy of the coating. The particles may agglomerate after the sulphur dust is applied, but even before application, finely divided sulphur exhibits marked tendency to compact into pellets or even into lumps. This tendency interferes with spreading sulphur in an even manner.

Not only should sulphur be spread evenly for best use of its coating properties, but it should flow freely through apparatus that is used in distributing sulphur dust. It is quite undesirable to expend the effort and energy necessary to provide sulphur dust and then to find that the sulphur has become lumpy again. Yet oftentimes pellets do form by agglomeration of fine sulphur dust and they may be nearly as hard as the lumps of crude sulphur were initially.

The tendency of sulphur dust to agglomerate is marked when the sulphur is moist. But the tendency of sulphur dust to form pellets persists even when the dust is dry. In storage, as for example in bags, finely divided sulphur lumps to an exceedingly objectionable degree. Moreover, whether sulphur is moist or whether it is dry, sulphur powder is not always free-flowing even though there has been no substantial formation of pellets or of lumps.

An important purpose with respect to this invention is to prepare sulphur that is free-flowing. An important object also is to present a composition that is substantially all sulphur and yet possesses the peculiar properties of sulphur dust in coating surfaces, and that exhibits tenacity and covering power, and weather resistance on the surfaces dusted.

A very important purpose moreover is to provide a composition of sulphur dust with finely divided material of certain sort to be described, intimately distributed therethrough, but maintaining properties of the composition as essentially those of sulphur.

A particular advantage and purpose in use of this invention is to provide a composition substantially all of sulphur dust that will not compact, but will remain free-flowing even though the composition be subjected to pressure for a period of months. These objects and others will be apparent in the following description of the principles of this invention and in the novel features thereof as particularly pointed out in the appended claim.

Various benefits of this invention are attained by what is now regarded as preferred practice of the invention; that is, by distributing intimately through sulphur dust a slight amount of finely divided absorbent clay that has been modified by contact with oil.

A specific illustration of this practice comprises mixing with sulphur dust spent clay that has been used in refining mineral oil, though this invention is not limited to this particular embodiment. An especially efficacious practice under this invention is to intermix with ground sulphur a small amount of clay that has been used in vapor-phase refining or sweetening of gasoline. In particular, it is most effective for this purpose to intermix fuller's earth that has been used as a catalyst in the vapor-phase sweetening of gasoline to convert aliphatic hydrocarbons into aromatic hydrocarbons. Without limiting this invention to any theory it is quite possible that such of the converted compounds as are sulphur compounds may have affected the surfaces of the spent fuller's earth adsorbent so as to render that material particularly effective in this invention. It is certain, however, that this material is exceedingly effective when ground with finely divided sulphur, while in comparison the same fuller's earth before its use in the mineral oil refining is relatively much less effective for the present purposes. Such fuller's earth is known of itself and is available from various oil refineries.

This spent fuller's earth may be ground to fine condition and then intermixed with finely divided sulphur or the fuller's earth and the sulphur may be finely ground with each other. The quantities of finely divided spent fuller's earth that may be admixed with finely divided sulphur vary. For commercial purposes it is preferable to limit the ratio of spent fuller's earth to about 1 to 10% of finely divided sulphur. This is particularly effective when the sulphur is of fineness of the order of 95% through a 325 mesh sieve. Under specifications of the U. S. Bureau of Standards, such a sieve opening is about 0.044 mm. so such particles are practically less than 44 microns in size. However, the invention is of some benefit even with larger particles.

This composite of spent fuller's earth and fine sulphur resists and substantially overcomes the tendency of sulphur particles to agglomerate on standing. Occasionally under some circumstances this conditioned sulphur may appear superficially to form lumps, but the lumps are such as will separate into powder even by falling through the air. This composition is free-flowing.

This invention has been illustrated with reference to certain spent fuller's earth, but benefits of the invention are obtained in some degree even where fuller's earth from other phases of oil refining is intermixed with the sulphur. It may be added, however, that the clay that is freshly removed from the catalyst system in the oil refinery is considerably more effective than the same clay that has been exposed to the atmosphere or weathered for some time. Further, in lieu of so-called fuller's earth, spent infusorial earth or spent bentonite from gasoline sweetening may be used.

Benefits are obtainable under this invention in some measure also where in lieu of fuller's earth from mineral oil refining there is intermixed with sulphur powder the so-called "foots" from vegetable oil refining; that is, fuller's earth or infusorial earth or the like that has been contacted with vegetable oil to alter the oil with respect to certain suspended matter.

While in accordance with the patent statutes, I have described a preferred embodiment of this invention, it will now be apparent to those skilled in the art that modifications and alterations may be made within the scope of the appended claim.

What I claim is:

A dry pulverulent composition of matter having the tenacious and weather resisting surface coating characteristics of pure sulphur dust, with the free flowing property of sulphur dust enhanced, comprising a mixture of finely divided sulphur and finely divided fuller's earth mineral oil foots, in which the proportion by weight of the foots is within a range of from 1% to 10% of the sulphur.

FAIRLEIGH E. SMITH.